US008892634B2

(12) United States Patent
Pierce et al.

(10) Patent No.: US 8,892,634 B2
(45) Date of Patent: Nov. 18, 2014

(54) EXTENSIBLE VIDEO PLAYER SELECTION VIA SERVER-SIDE DETECTION OF CLIENT APPLICATION

(75) Inventors: Eric Pierce, Bellevue, WA (US); Mahua Chaudhuri, Issaquah, WA (US); Parag Dharap, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 404 days.

(21) Appl. No.: 12/944,721

(22) Filed: Nov. 12, 2010

(65) Prior Publication Data

US 2012/0124123 A1    May 17, 2012

(51) Int. Cl.
G06F 15/16    (2006.01)
H04N 21/61    (2011.01)
H04N 21/4782    (2011.01)
H04N 21/258    (2011.01)

(52) U.S. Cl.
CPC ....... *H04N 21/4782* (2013.01); *H04N 21/6175* (2013.01); *H04N 21/6125* (2013.01); *H04N 21/25858* (2013.01)
USPC ............................ 709/203; 709/229; 725/151

(58) Field of Classification Search
USPC .................................. 709/203, 229; 725/151
See application file for complete search history.

(56) References Cited

U.S. PATENT DOCUMENTS 7,072,984 B1 *   7/2006   Polonsky et al. ............. 709/246
7,360,152 B2     4/2008   Capps et al.
7,443,879 B2 *  10/2008   Ejzak et al. ................... 370/465
7,769,895 B1 *   8/2010   Williams et al. ............. 709/246
8,244,707 B2 *   8/2012   Lin et al. ....................... 707/706
8,583,758 B2 * 11/2013   Casey et al. ................... 709/217
2006/0026302 A1 * 2/2006  Bennett et al. ................ 709/246
2007/0028278 A1 * 2/2007  Sigmon et al. ................ 725/113
2007/0028288 A1 * 2/2007  Sigmon et al. ................ 725/136
2008/0195698 A1 * 8/2008  Stefanovic et al. ........... 709/203
2008/0235580 A1   9/2008  Gonze et al.
2009/0070673 A1   3/2009  Barkan et al.
2009/0106639 A1   4/2009  Blinnikka et al.
2009/0182889 A1   7/2009  Hurst et al.

(Continued)

FOREIGN PATENT DOCUMENTS

WO    WO 2010062761 A1 *  6/2010   .............. H04L 29/08

OTHER PUBLICATIONS

Bouthillier, Larry, "Detecting Streaming Media Players and Connection Speed Tutorial—Part One", Retrieved at << http://www.learningapi.com/sm5/articlesm5.html >>, Retrieved Date: Aug. 23, 2010, pp. 3.

(Continued)

*Primary Examiner* — Thanh Tammy Nguyen
*Assistant Examiner* — Jonathan Bui
(74) *Attorney, Agent, or Firm* — Bryan Webster; Kate Drakos; Micky Minhas (57) ABSTRACT

A web server receives from different client applications HTTP requests for the same webpage in which video content is to be embedded. The web server provides to each of the client applications an HTTP response to the HTTP request. The HTML or XHTML text included in the response references the video content solely in a manner that is specific to a single video player. The HTML or XHTML text returned in a response to a request may be different for different client applications, even though the different client applications all requested the same webpage or portion of webpage. The video file referenced by the HTML or XHTML text returned in a response may be different for different client applications, even though the video files encode the same video content.

20 Claims, 7 Drawing Sheets

(56) References Cited

U.S. PATENT DOCUMENTS

2012/0054809 A1* 3/2012 Chowdhury et al. ............ 725/93
2012/0078997 A1* 3/2012 Evans et al. ................... 709/203
2012/0084835 A1* 4/2012 Thomas et al. ................... 726/3

OTHER PUBLICATIONS

"Flash—Different Methods for Flash Player Detection in a Browser", Retrieved at << http://www.evontech.com/login/topic/1091.html >>, Retrieved Date: Sep. 26, 2010, pp. 4.

"HTML5 video markup, compatibility and playback", Retrieved at << http://www.niallkennedy.com/blog/2010/02/html5-video-markup.html >>, Feb. 2008, pp. 9.

Pilgrim, Mark, "Video on the Web", Retrieved at << http://diveintohtml5.org/video.html >>, May 19, 2010, pp. 35.

Lott, et al., "O'Reilly Network: Runtime Environment: Chapter 3—ActionScript 3.0 Cookbook", Retrieved at << http://oreilly.com/lpt/a/7414 >>, Retrieved Date: Sep. 26, 2010, pp. 14.

* cited by examiner

FIG. 7

EXTENSIBLE VIDEO PLAYER SELECTION VIA SERVER-SIDE DETECTION OF CLIENT APPLICATION

BACKGROUND

Webpages are requested and served from web servers using Hypertext Transfer Protocol 'HTTP'. A client application, for example, a web browser or an online help application, runs on a client computer. The client application sends an HTTP request to the web server, which returns an HTTP response. The HTTP response includes text for the webpage, usually in Hypertext Markup Language 'HTML' or eXtensible HTML 'XHTML' format. The HTTP response is accompanied by files referenced in the HTML or XHTML text, for example, image files, client-side scripts, and video files.

A static webpage presents the same fixed set of information to different users at different times. A dynamic webpage can change in response to different contexts or conditions. A client-side computer program, for example, client-side scripting, may be included in or referenced by a webpage that is retrieved from a web server. The client-side computer program, which may change the presentation of the webpage in the client application, is executed by the client computer through the client application. A server-side computer program, for example, server-side scripting, is executed by a web server when an HTTP request is received in order to generate dynamically the HTML or XHTML text to be returned in the HTTP response to the HTTP request.

Currently, video embedded in a webpage is typically played back in the web browser by a video player that is a platform-dependent plug-in to the web browser. Video players currently available include Microsoft® Windows Media® player, Microsoft® Silverlight® media player, Adobe® Flash® player, Apple® QuickTime® player and Real-Player® media player. Different web browsers and even different versions of the same web browser may support different video players.

Video is stored in a video container file ("video file"), which usually includes a video track (without audio), plus one or more audio tracks (without video). The video track has been encoded using a video codec and each audio track has been encoded using an audio codec. Some video container formats, for example, the MPEG-4 Part 14 format commonly using file extension .MP4 described in the ISO/IEC 14496-14:2003 standard, are supported by many video players. Other video container formats, for example, the Flash Video format commonly using file extension .FLV, are supported only by a limited number of video players.

A webpage that embeds video may specify a single video player for playback of the video. In this case, the video will be played back only if the web browser that retrieves the webpage supports the specified video player. If the web browser that retrieves the webpage does not support the specified video player, the video will not be played back. This situation will occur frequently because no one video player is ubiquitous. The webpage may be created so that in the event that the web browser does not support the specified video player, a hyperlink is provided to a website where the specified video player can be downloaded. A person viewing the webpage in a web browser that does not support the specified video player may decide not to download the specified video player and the video will not be played back in the web browser. Even if that person does download the specified video player, the experience of the webpage is unsatisfactory due to the additional effort required by the person to view the video.

A webpage that embeds video may include client-side scripting that selects a video player based on various factors determined at the web browser. If execution of client-side scripting has been disabled in the web browser that retrieves the webpage, or if execution of client-side scripting is performed in the web browser only if permission from a user to do so is given and the user denies such permission, the video will not be played back in the web browser. The fact that video is embedded in the webpage may be hidden from search engines if the reference to the video is encapsulated in the client-side scripting, because some search engines do not execute any client-side scripting or do not execute all client-side scripting in a webpage. Inclusion in a webpage of client-side scripting for selection of a video player increases the amount of data retrieved from a web server, thus consuming more data communication resources, and burdens the web browser with the responsibility for video player selection, possibly slowing down the presentation of the webpage or the presentation of the video or both. The selection of the video player in the client-side scripting language may be expressed in the form of "if circumstance 1 select video player 1 else if circumstance 2 select video player 2 else if . . . else . . . " to specify the video player in many different circumstances. The entire client-side scripting is sent to all client computers that retrieve the webpage from a web server, regardless of how much of the client-side script needs to be executed before the circumstances applicable to the client computer and its web browser are handled.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A client application creates a request for a webpage, and the request is sent by a client computer to a server computer. A response to the request is sent from the server computer to the client computer, where it is handled by the client application that created the request. The response includes Hypertext Markup Language 'HTML' or eXtensible HTML 'XHTML' text for the requested webpage. Files referenced by the webpage are sent with the response. Specifically, if video content is supposed to be embedded in the webpage, then one or more video files are sent with the response.

The HTML or XHTML text included in the response references the video content solely in a manner that is specific to a single video player. The single video player was selected by the server computer from a list of one or more video players associated in advance with the webpage. If all video content to be embedded in the webpage is available in the same container format and same video codec and same audio codec, then the list may comprise a list of one or more video players. If all video content to be embedded in the webpage is available in the same two or more combinations of container format, video codec and audio codec, then the list may comprise a list of one or more [video player, video file] pairs. If there is only one video player or [video player, video file] pair in the list, then the HTML or XHTML text included in the response references the video content solely in a manner that is specific to that video player. If there is more than one video player or [video player, video file] pair in the list, then the server computer selects the single video player based on the order of the video players or the [video player, video file]

pairs in the list and based on whether any of the video players in the list is supported by the client application that created the request.

By analyzing the request, the server computer identifies which client application created the request. The server computer also has access to mappings of which client applications support which video players. The server computer consults these mappings to determine whether a video player in the list is supported by the identified client application. New client applications and new video players can be added to the mappings as they become available, and new video players and new [video player, video file] pairs can be added to the lists as they become available.

The HTML or XHTML text returned in a response to a request may be different for different client applications, even though the different client applications all requested the same webpage. The video file referenced by the HTML or XHTML text returned in a response may be different for different client applications, even though the video files encode the same video content.

A collection of related webpages that share similar styles can be thought of as a particular "experience". Different lists of one or more video players may be associated with different experiences (and by extension, to all webpages in that experience), so that a variety of client applications can be supported, while still controlling the video experience of the webpages.

BRIEF DESCRIPTION OF THE DRAWINGS

Embodiments are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

A client application creates an HTTP request for a webpage or a portion of a webpage, and the HTTP request is sent by a client computer to a server computer. An HTTP response to the HTTP request is sent from the server computer to the client computer, where it is handled by the client application that created the HTTP request. The HTTP response includes HTML or XHTML text for the requested webpage or portion of a webpage. Files referenced by the webpage or portion of webpage are sent with the HTTP response. Specifically, if video content is supposed to be embedded in the webpage or portion of webpage, then one or more video files are sent with the HTTP response.

The HTML or XHTML text included in the HTTP response references the video content solely in a manner that is specific to a single video player. The single video player was selected by the server computer from a list of one or more video players associated in advance with the webpage. If all video content to be embedded in the webpage or portion of webpage is available in the same container format and same video codec and same audio codec, then the list may comprise a list of one or more video players. If all video content to be embedded in the webpage or portion of webpage is available in the same two or more combinations of container format, video codec and audio codec, then the list may comprise a list of one or more [video player, video file] pairs. If there is only one video player or [video player, video file] pair in the list, then the HTML or XHTML text included in the HTTP response references the video content solely in a manner that is specific to that video player. If there is more than one video player or [video player, video file] pair in the list, then the server computer selects the single video player based on the order of the video players or the [video player, video file] pairs in the list and based on whether any of the video players in the list is supported by the client application that created the HTTP request.

By analyzing the HTTP request, the server computer identifies which client application created the HTTP request. The server computer also has access to mappings of which client applications support which video players. The server computer consults these mappings to determine whether a video player in the list is supported by the identified client application. New client applications and new video players can be added to the mappings as they become available, and new video players and new [video player, video file] pairs can be added to the lists as they become available.

If the first video player in the list is supported by the identified web browser, then the server computer selects the first video player or the first [video player, video file] pair. If the first video player in the list is not supported by the identified client application, then the server computer checks whether the next video player in the list is supported by the identified client application, and so on. If no previous video player in the list has been selected, the last video player or the last [video player, video file] pair in the list is selected by the server computer, regardless of whether the last video player in the list is supported by the identified client application.

The HTML or XHTML text returned in an HTTP response to an HTTP request may be different for different client applications, even though the different client applications all requested the same webpage or portion of webpage. Suppose the video file or files to be embedded are in the MPEG-4 video container format, where the video track was encoded using an H.264 video codec and the audio track or tracks were encoded using an Advanced Audio Coding 'AAC' audio codec. Such video files are referred to in this document as MP4+H.264+ AAC video files. (Video files in the Ogg video container format, where the video track was encoded using a Theora video codec and the audio track or tracks were encoded using a Vorbis audio codec, are referred to in this document as Ogg+Theora+Vorbis video files.) If the client application that created the HTTP request is HTML5-capable (or compatible with a successor to HTML5) and has a native video player that can play MP4+H.264+AAC video files, the HTML or XHTML text returned in an HTTP response to that client application may use the HTML5 <video> element. If the client application that created the HTTP request is not HTML5-capable, yet has a video player plug-in that can play MP4+H.264+AAC video files, the HTML or XHTML text returned in an HTTP response to that client application may use the HTML <object> element that identifies the video player plug-in of the client application that created the HTTP request. If the client application that created the HTTP request is not HTML5-capable, and does not have a video player plug-in that can play MP4+H.264+AAC video files, the HTML or XHTML text returned in an HTTP response to that client application may use the HTML <object> element that identifies yet another video player plug-in that can play MP4+H.264+AAC video files.

A collection of related webpages that share similar styles can be thought of as a particular "experience". Different lists of one or more video players may be associated with different experiences (and by extension, to all webpages in that experience), so that a variety of client applications can be supported, while still controlling the video experience of the webpages.

Figure 1:
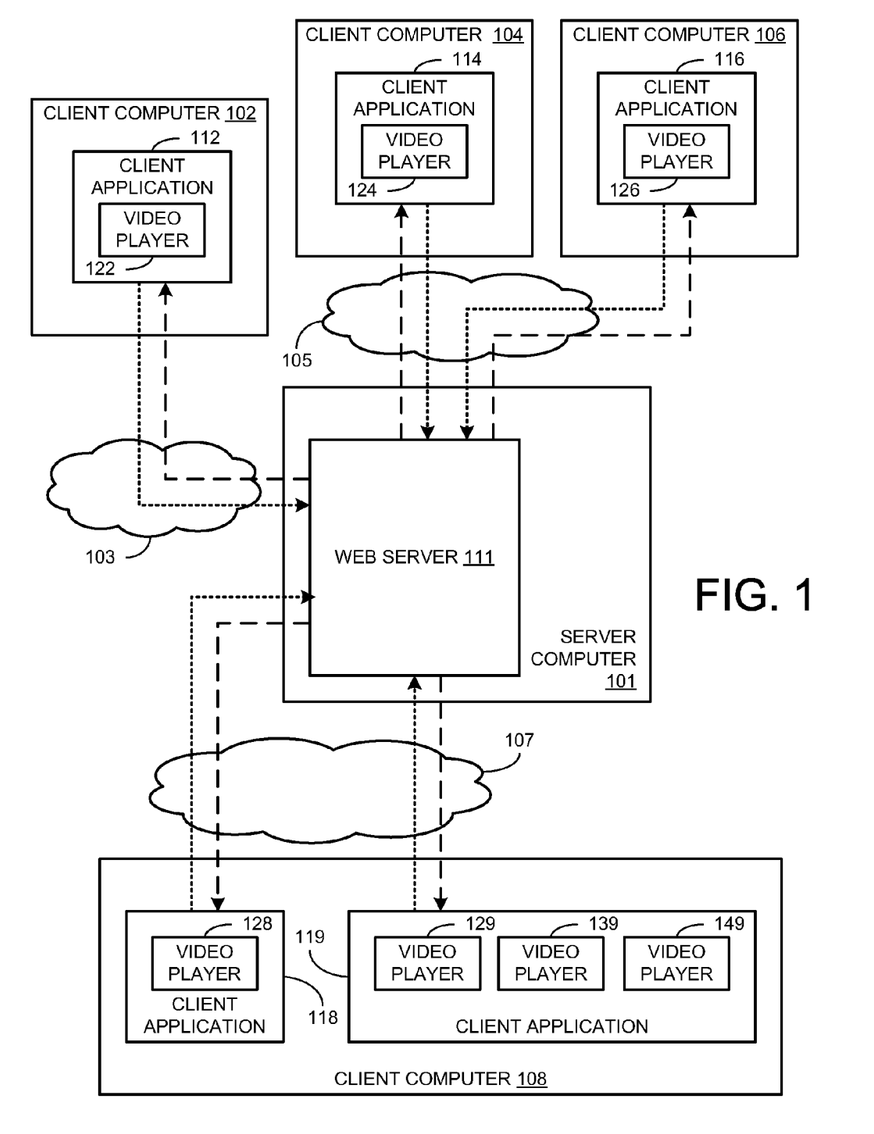
FIG. 1 is an illustration of an example client-server computer system for delivery of webpages or portions of webpages or both.

FIG. 1 is an illustration of an example client-server computer system for delivery of webpages or portions of webpages or both. For example, an Asynchronous JavaScript and XML 'AJAX' request is an example of an HTTP request for a portion of a webpage. A server computer 101 is able to respond to HTTP requests for webpages or portions of webpages or both by providing HTTP responses. Server computer 101 has installed thereon an HTTP server, also known as web server 111. Client computers 102, 104, 106, and 108 are illustrated in FIG. 1. In FIG. 1, the HTTP requests are illustrated as dotted arrows, and the HTTP responses are illustrated as dashed arrows. Each [HTTP request, HTTP response] pair may be carried over a network, for example, an intranet or the Internet. Example networks 103, 105 and 107 are illustrated in FIG. 1.

The HTTP requests are created by a client application, for example, a web browser or an online help application. In the example illustrated in FIG. 1, client application 112 is installed on client computer 102, client application 114 is installed on client computer 104, client application 116 is installed on client computer 106, and client applications 118 and 119 are is installed on client computer 108.

Some client applications, for example, HTML5-capable web browsers, include a native video player able to play video files with a particular container format, video codec and audio codec. Other client applications, for example, web browsers that are not HTML5-capable, are able to play video files only with a video player plugin. Some web browsers are provided with one or more pre-installed video player plugins. In the example illustrated in FIG. 1, client application 112 includes a video player 122, client application 114 includes a video player 124, client application 116 includes a video player 126, client application 118 includes a video player 128, and client application 119 includes a video player 129.

Web server 111, client applications 112, 114, 116, 118 and 119, and video players 122, 124, 126, 128 and 129 may be implemented in software, in firmware, in hardware, or in any combination thereof. For example, video players may make use of hardware accelerators or graphics processing units on client computers, in addition to or instead of central processing units on the client computers.

An example configuration of the client computer, client applications, and video players for FIG. 1 is summarized in the following table:

TABLE 1

Example configuration of client computers, client applications, video players

| Client Computer | Client Application | Video Player |
| --- | --- | --- |
| Client Computer 102: Laptop computer, Windows Vista ® operating system | Client Application 112: Internet Explorer ® 6 web browser (not HTML5-capable) | Video Player 122: Windows Media ® player plugin; |
| Client Computer 104: Desktop computer, Windows Vista ® operating system | Client Application 114: Firefox ® 3.6 web browser (HTML5-capable) | Video Player 124: Native video player of Firefox ® 3.5 web browser, able to play Ogg + Theora + Vorbis video files |
| Client Computer 106: iPhone ® 3 smartphone | Client Application 116: iPhone ® 3 web browser (HTML5-capable) | Video Player 126: Native video player of web browser, able to play MP4 + H.264 + AAC video files |
| Client Computer 108: Laptop computer, Windows ® 7 operating system | Client Application 118: Internet Explorer ® 9 beta web browser (HTML5-capable) | Video Player 128: Native video player of Internet Explorer ® 9 beta web browser, able to play MP4 + H.264 + AAC video files |
| | Client Application 119: Google Chrome ™ 5.0 (HTML5 capable) | Video Player 129: Native HTML5 video player of Google Chrome ™ 5.0, able to play MP4 + H.264 + AAC video files |
| | | Video Player 139: Native HTML5 video player of Google Chrome ™ 5.0, able to play Ogg + Theora + Vorbis video files |
| | | Video Player 149: Adobe ® Flash ® video player |

Server computer 101 stores or has access to descriptions of webpages. A webpage may be in the form of a Hypertext Markup Language 'HTML' document or an eXtensible HTML 'XHTML' document. For example, the description of a webpage may be the HTML or XHTML document itself, as in the case of a static webpage. In another example, as in the case of some dynamic webpages, the description of a webpage may be what is used by the web server to generate the HTML or XHTML document.

Figure 2:
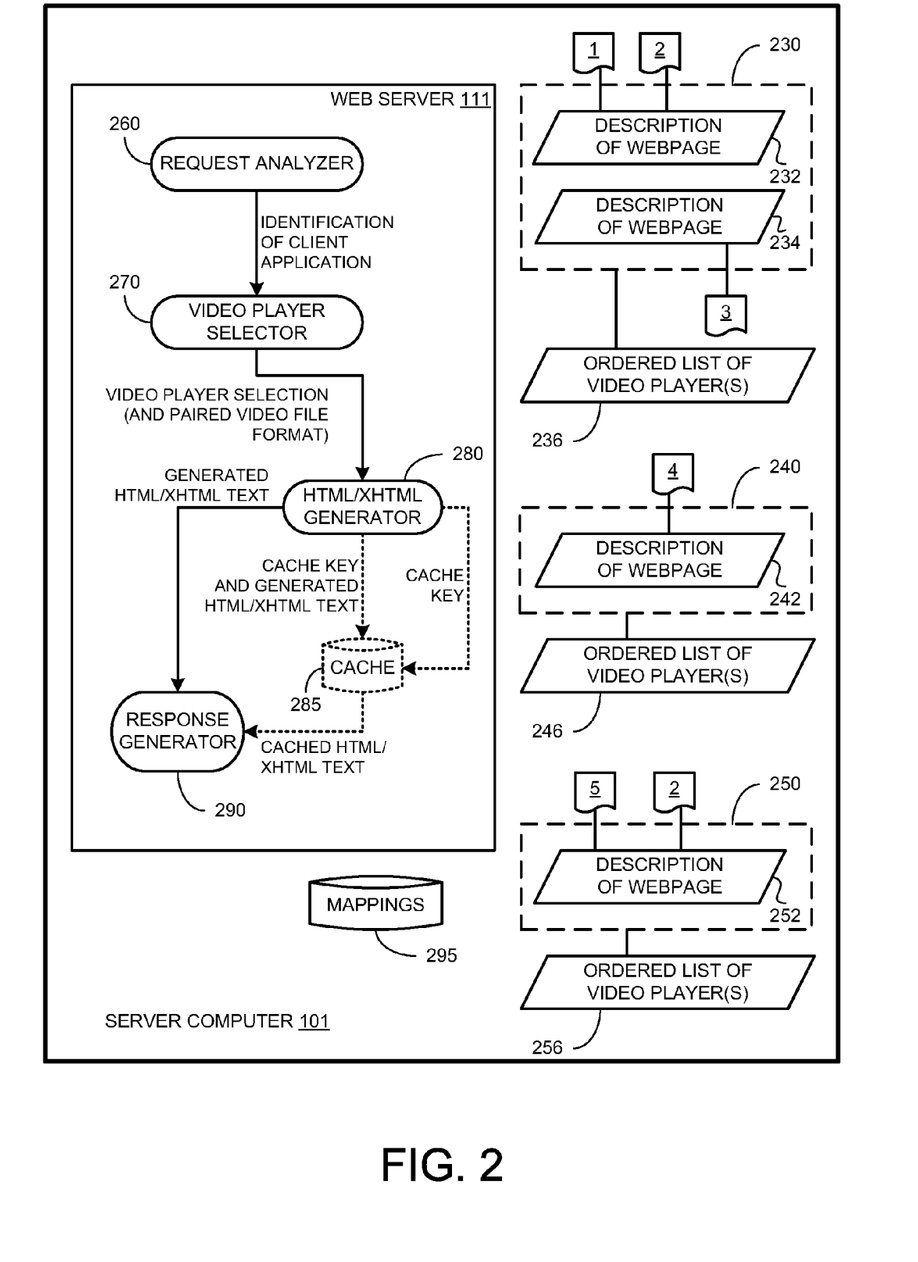
FIG. 2 is an illustration of an example server computer in the system illustrated in FIG. 1.

More detail regarding server computer 101 and web server 111 is provided with respect to FIG. 2.

A web server may support only a single experience. Alternatively, a web server may support two or more different experiences. For example, a certain experience may be accessible only through a particular client application or a set of particular client applications, as is often the case with an online help application. In another example, a website may be partitioned into two or more experiences, based on the domain or path of the Uniform Resource Locator 'URL' that describes where the description of the webpage is found.

In the example illustrated in FIG. 2, an experience 230 includes a description 232 of a webpage and a description 234 of another webpage. Video files 1 and 2 are referenced by description 232, and a video file 3 is referenced by description 234. Video files 1, 2, and 3 encode different video content in the same format. An ordered list 236 of one or more video players is associated with experience 230 and, by extension, with the webpages described in descriptions 232 and 234. Although the phrase "ordered list" is used in this document, it is contemplated that the arrangement of identifiers of one or more video players may be in a format other than an ordered list. An experience 240 includes a description 242 of a webpage. A video file 4 is referenced by description 242. An ordered list 246 of one or more video players is associated with experience 240 and, by extension, with the webpage described in description 242. An experience 250 includes a description 252 of a webpage. Video file 2 and a video file 5, both encoding the same video content but in different formats, are referenced by description 252. An ordered list 256 of one or more video players is associated with experience 250 and, by extension, with the webpage described in description 252. Ordered list 256 lists [video player, video file format] pairs. Note that the same video file, namely video file 2, is referenced by descriptions in both experience 230 and experience 250.

Ordered lists, for example, ordered lists 236, 246 and 256, may be implemented in eXtensible Markup Language AMU. The following example XML text provides an ordered list, starting with an HTML5 native video player for MP4+H.264+AAC video files, followed by the Windows Media® player, followed by the Silverlight® player. The <Players> element and the <Player> element and its type attribute may be defined in a Document Type Definition 'DTD' file or an XML Schema file or the like.

```
<Players>
    <Player type="html5mp4player">
    <Player type="wmplayer">
    <Player type="Silverlightplayer">
</Players>
```

As noted above, the ordered list may comprise [video player, video file] pairs. The following example XML text provides an ordered list, starting with an HTML5 native video player for MP4+H.264+AAC video files, followed by an HTML5 native video player for Ogg+Theora+Vorbis video files, followed by the Windows Media® player paired with .WMV video files. The <PlayerVideoPairs> element and the <PlayerVideoPair> element and its ptype and vtype attributes may be defined in a Document Type Definition 'DTD' file or an XML Schema file or the like.

```
<PlayerVideoPairs>
    <PlayerVideoPair ptype="html5mp4player" vtype="mp4">
    <PlayerVideoPair ptype="html5oggplayer" vtype="ogg">
    <PlayerVideoPair ptype="wmplayer" vtype="wmv">
</PlayerVideoPairs>
```

Web server 111 comprises an HTTP request analyzer 260, a video player selector 270, an HTML/XHTML generator 280, and an HTTP response generator 290. For clarity, other components of web server 111 are not shown or discussed.

Server computer 101 may store or have access to mappings 295 of which client applications support which video players. Mappings 295 may be implemented in records of the form [specific video player, set of client applications that support the specific video player]. It will be appreciated that a particular client application may support more than one video player and therefore may appear in more than one record in mappings 295. For example, the Google Chrome™ 5.0+ web browser bundles the Adobe® Flash® player and also has an HTML5 native video player for MP4+H.264+AAC and an HTML5 native video player for Ogg+Theora+Vorbis. Other implementations of mappings 295 are also contemplated.

For example, mappings 295 may be implemented in XML. The following example XML text indicates that an HTML5 native video player for MP4+H.264+AAC video files is supported by the Internet Explorer® 9.0+ web browser, the Safari® 3.0+ web browser, the Google Chrome™ 5.0+ web browser, the iPhone® 3.0+ web browser and by the Android™ 2.0+ web browser. The following example XML text further indicates that an HTML5 native video player for Ogg+Theora+Vorbis video files is supported by the Firefox® 3.5+ web browser, the Google Chrome™ 5.0+ web browser, and the Opera© 10.5+ web browser. The following example XML text further indicates that the Windows Media® player is supported by the Internet Explorer® 6.0+ web browser. The <PlayerSupportedBrowsersList> element, the <PlayerSupportedBrowsers> element its name attribute, the <browsers> element, and the <browser> element and its type and aboveVersion attributes may be defined in a Document Type Definition 'DTD' file or an XML Schema file or the like.

```
<PlayerSupportedBrowsersList>
    <PlayerSupportedBrowsers name="html5mp4player">
        <browsers>
            <browser type="IE" aboveVersion="9.0" />
            <browser type="Safari" aboveVersion="3.0" />
            <browser type="Chrome" aboveVersion="5.0" />
            <browser type="iPhone" aboveVersion="3.0" />
            <browser type="Android" aboveVersion="2.0" />
        </browsers>
    </PlayerSupportedBrowsers>
    <PlayerSupportedBrowsers name="html5oggplayer">
        <browsers>
            <browser type="Firefox" aboveVersion="3.5" />
            <browser type="Chrome" aboveVersion="5.0" />
            <browser type="Opera" aboveVersion="10.5" />
        </browsers>
    </PlayerSupportedBrowsers>
    <PlayerSupportedBrowsers name="wmplayer">
        <browsers>
            <browser type="IE" aboveVersion="6.0" />
        </browsers>
    </PlayerSupportedBrowsers>
</PlayerSupportedBrowsersList>
```

HTTP request analyzer 260 may analyze an HTTP request for a webpage or a portion of a webpage and determine from the HTTP request an identification of the client application that created the HTTP request. HTTP request analyzer may provide the identification of the client application that created the HTTP request to video player selector 270.

Video player selector 270 may select a video player that affects how video is referenced by the HTML or XHTML text returned to the client application that created the HTTP request. In order to select the video player, video player selector 270 may rely on the identification of the client application that created the HTTP request, mappings 295, and an ordered list of one or more video players associated with the experience to which the description of the requested webpage belongs. Video player selector 270 may provide to HTML/XHTML generator 280 the video player selection and, in the event that the video content is available in more than one video file format, the selected video player's paired video file format.

HTML/XHTML generator 280 may generate HTML or XHTML text that references video content solely in a manner specific to the video player selected by video player selector 270. The generated HTML or XHTML text makes reference to the video file for the video content that is in the paired video file format. HTML/XHTML generator 280 may provide the generated HTML or XHTML text to HTTP response generator 190.

HTTP response generator 290 may generate an HTTP response for the HTTP request, where the HTTP response includes the generated HTML or XHTML text generated by HTML/XHTML generator 280.

Web server 111 may optionally comprise a cache 185 of HTML or XHTML texts generated by HTML/XHTML generator 280. HTML/XHTML generator 280 may obtain a cache key for a particular combination of video player and webpage. If a cached HTML or XHTML text that references video content solely in the manner specific to the video player selected by video player selector 270 does not exist, HTML/XHTML generator 280 may cache the generated HTML or XHTML text in cache 285, indexed by the cache key. If a cached HTML or XHTML text that references video content solely in the manner specific to the video player selected by video player selector 270 exists, HTML/XHTML generator 280 may provide HTTP response generator 290 with a cached HTML or XHTML text from cache 285.

Figure 3:
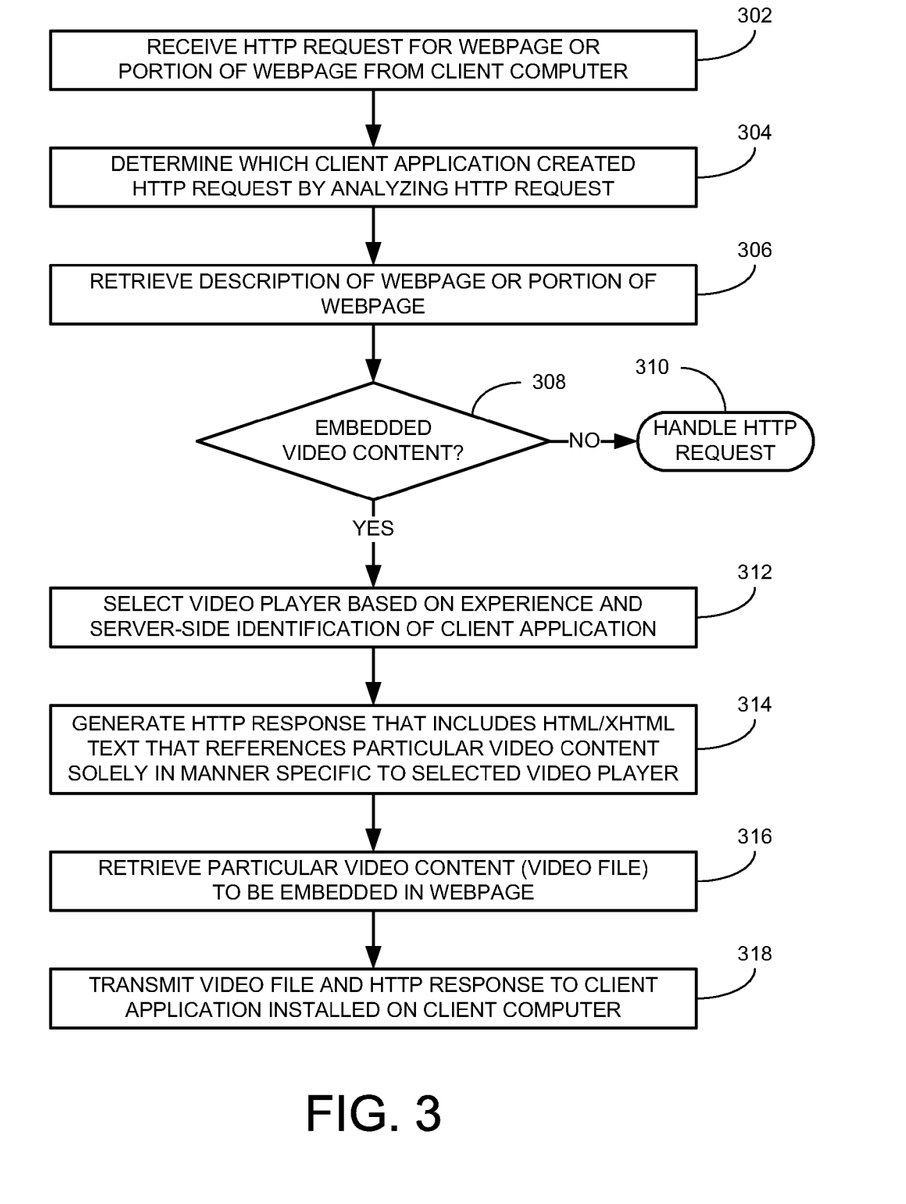
FIG. 3 is a flowchart of an example method for responding to HTTP requests for webpages or portions of webpages or both, the example method to be performed in a computer having installed thereon a web server.

FIG. 3 is a flowchart of an example method for responding to HTTP requests for webpages or portions of webpages or both, the example method to be performed in a server computer having installed thereon a web server.

At 302, server computer 101 may receive an HTTP request for a particular webpage or a particular portion of a webpage from a client computer. The webpage or particular portion of a webpage may be identified by a URL in the HTTP request.

At 304, HTTP request analyzer 260 may determine which client application created the HTTP request by analyzing the HTTP request.

For example, an HTTP request includes in its header a User-Agent field from which the client application can be identified. An example of a User-Agent field string sent by a client application that is not a web browser is "msnbot/1.1 (+http://search.msn.com/msnbot.htm)". Examples of User-Agent field strings sent by different web browsers are listed in the table below:

TABLE 2

Example User-Agent field strings for web browsers

| Web browser | User-Agent field string |
| --- | --- |
| Internet Explorer ® 9 web browser | Mozilla/5.0 (compatible; MSIE 9.0; Windows NT 6.1; WOW64; Trident/5.0) |
| Internet Explorer ® 8 web browser | Mozilla/4.0 (compatible; MSIE 8.0; Windows NT 6.1; WOW64; Trident/4.0; SLCC2; .NET CLR 2.0.50727; .NET CLR 3.5.30729; .NET CLR 3.0.30729; Media Center PC 6.0) |
| Firefox ® 3.6 web browser | Mozilla/5.0 (Windows; U; Windows NT 6.1; en-US; rv: 1.9.2.8) Gecko/20100722 Firefox/3.6.8 |
| Google Chrome ™ 6 web browser | Mozilla/5.0 (Windows; U; Windows NT 6.1; en-US) AppleWebKit/534.3 (KHTML, like Gecko) Chrome/6.0.472.63 Safari/534.3 |

HTTP request analyzer 260 may provide video player selector 270 with an identification of the client application that created the HTTP request.

At 306, web server 111 may retrieve a description of the webpage or a description of only the requested portion of the webpage, which is stored in or accessible by server computer 101. As noted above, in one example, the description of a webpage may be the HTML or XHTML document itself, as in the case of a static webpage. In another example, as in the case of some dynamic webpages, the description of the webpage may be what is used by the web server to generate the HTML or XHTML document.

At 308, web server 111 may analyze the retrieved description to determine whether video content is to be embedded in the webpage. For example, the web server may parse a static webpage written in HTML5 for the presence of the <video> element. In another example, the web server may parse a static webpage written in HTML for the presence of the <object> element with a type attribute that refers to an application that is a video player. In yet another example, the web server may parse a description to find a keyword, for example, "reference" or "embed" or "video", known to be used in the description to indicate that video content is to be embedded. In a further example, the web server may check whether indications of Multipurpose Internet Mail Extensions 'MIME' types of files identified in the description of a webpage are MIME types of video files.

If no video is to be embedded in the webpage, then web server 111 handles the HTTP request at 310 in a manner that is beyond the scope of this document.

If video is to be embedded in the webpage, web server 111 may involve video player selector 270. At 312, video player selector 270 may select a video player based on the experience to which the description of the requested webpage belongs and the server-side identification of the client application. Video player selection is described in more detail below, with respect to FIG. 5 and FIG. 6. Video player selector 270 may provide HTML/XHTML generator 280 or more generally, web server 111 with an identification of a selected video player and, in the event that the video content is available in more than one video file format, the selected video player's paired video file format.

At 314, HTTP response generator 290 may generate an HTTP response to the HTTP request, where the HTTP response includes HTML or XHTML text that references the particular video content solely in a manner that is specific to the selected video player.

In the event that the description of the webpage is the webpage itself, as in the case of a static webpage, the HTML or XHTML document returned to the client application in the HTTP response may differ from the original HTML or XHTML document, in that the HTML or XHTML text that references the particular video content in the original HTML or XHTML document has been replaced with HTML or XHTML text that references the particular video content solely in a manner that is specific to the selected video player.

For example, the original HTML or XHTML document may reference the video content by HTML or XHTML text that specifies a Flash® player plug-in, and the HTML or XHTML document in the HTTP response generated by HTTP response generator 290 may reference the video content by HTML or XHTML text that specifies a Silverlight® player plug-in.

As a specific example, the following HTML text in the original HTML document:

```
<object type="application/x-shockwave-flash">
    <param name="movie" value="video.swf" />
</object>
``` may be replaced in the HTML document in the HTTP response with the following HTML text:

```
<object type="application/x-silverlight-2">
    <param name="source" value="MediaPlayer.xap" />
    <param name="InitParams" value="mediaurl=video.mp4" />
</object>
```

At 316, web server 111 may retrieve the particular video content to be embedded in the webpage, which is stored in or accessible by server computer 101. The particular video content is retrieved in the form of a video file. In the event that the video content is available in more than one video file format, the retrieved video file is the video file that is in the selected video player's paired video file format.

At 318, web server 111 may transmit the retrieved video file and the HTTP response generated by HTTP response generator 290 to the client application that sent the HTTP request.

Figure 4:
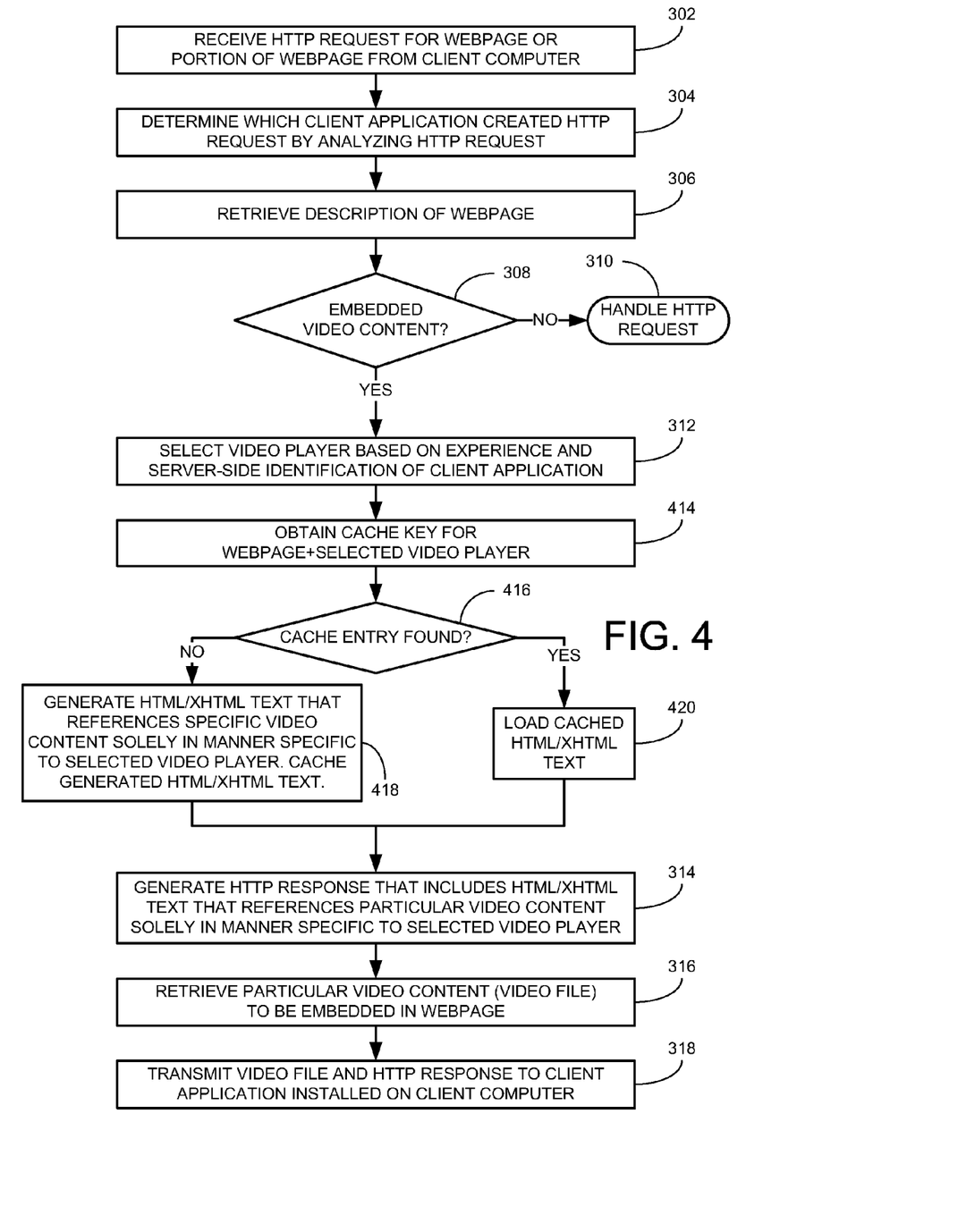
FIG. 4 is a flowchart of another example method for responding to HTTP requests for webpages or portions of webpages or both, the example method to be performed in a computer having installed thereon a web server.

FIG. 4 is a flowchart of another example method for responding to HTTP requests for webpages or portions of webpages or both, the example method to be performed in a server computer having installed thereon a web server. The example method differs from that described above with respect to FIG. 3 in that web server 111 has access to cache 285.

After video player selector 270 selects a video player at 312, web server 111 may obtain at 414 a cache key for the combination of the requested webpage and the selected video player. If the HTTP request is for a portion of a webpage, it may be possible for web server 111 to obtain at 414 a cache key for the combination of the requested portion and the selected video player. At 416, web server 111 may check whether the cache key corresponds to an entry in cache 285.

If there is no entry corresponding to the cache key, HTML/XHTML generator 280 may generate at 418 HTML or XHTML text that references the particular video content solely in a manner that is specific to the selected video player and caches the generated HTML or XHTML text in cache 285, indexed by the cache key. HTTP response generator 290 may then generate at 314 an HTTP response to the HTTP request that includes the HTML or XHTML text generated by HTML/XHTML generator 280 at 418, web server 111 may retrieve at 316 the particular video content to be embedded in the webpage, and web server 111 may transmit the retrieved video file and the HTTP response generated by HTTP response generator 290 to the client application at 318.

If there is an entry corresponding to the cache key, at 420 web server 111 may load the cached HTML or XHTML text from cache 285, which is a previously-generated HTML or XHTML text that references the particular video content solely in a manner that is specific to the selected video player. HTTP response generator 290 may then generate at 314 an HTTP response to the HTTP request that includes the HTML or XHTML text generated by HTML/XHTML generator 280 at 418, web server 111 may retrieve at 316 the particular video content to be embedded in the webpage, and web server 111 may transmit the retrieved video file and the HTTP response generated by HTTP response generator 290 to the client application at 318.

It is contemplated that portions of the example methods are performed in a different order than that illustrated in FIG. 3 or in FIG. 4. For example, in the event that the video content is available only in one video file format, the particular video content to be embedded in the webpage may be retrieved anytime after the description of the webpage has been retrieved at 306 and before the transmission of the retrieved video file and the HTTP response at 318. In another example, in the event that the video content is available in more than one video file format, the particular video content to be embedded in the webpage may be retrieved anytime after the video player has been selected at 312 and before the transmission of the retrieved video file and the HTTP response at 318.

It will be appreciated by persons of ordinary skill in the art that more than one video content may be embedded in a webpage. This will be apparent from the description of the webpage. In this situation, the example methods illustrated in FIG. 3 and FIG. 4 may be understood as follows. Web server 111 may retrieve two or more video files (one per video content to be embedded) at 316, and the HTTP response generated at 314 will include HTML or XHTML text that references each video content solely in the manner specific to the selected video player. This is what may occur in the Experience 230 Example described below for the webpage described by description 232, which embeds video files 1 and 2.

Figure 5:
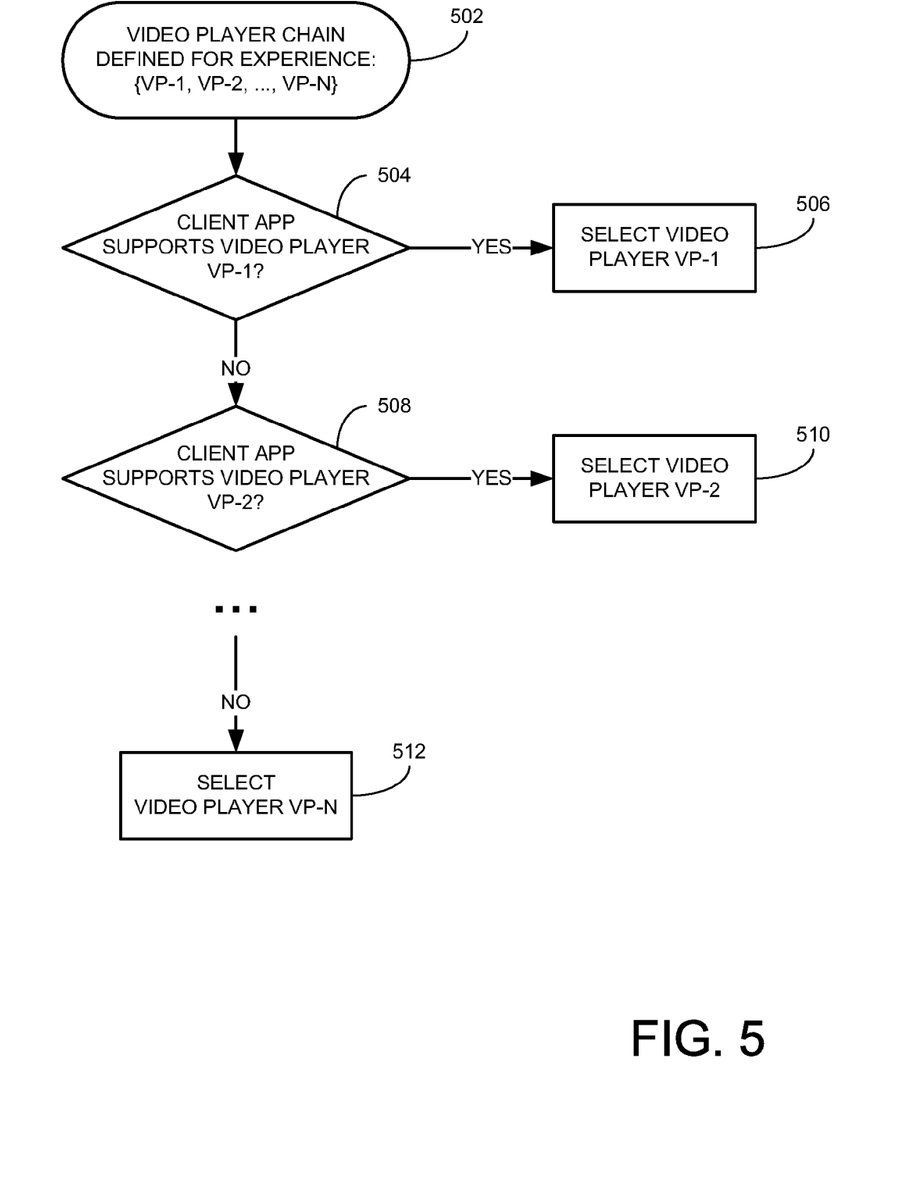
FIG. 5 is a flowchart of an example method for selecting a video player.

FIG. 5 is a flowchart of an example method for selecting a video player, to be implemented by video player selector 270. As mentioned above, selection of the video player depends on the experience and on the server-side detected identification of the client application that created the HTTP request.

An ordered list of one or more video players is associated with the experience to which the description of the requested webpage belongs. In the example illustrated in FIG. 5, the ordered list is {VP-1, VP-2, . . . , VP-N}, as indicated at 502.

At 504, video player selector 270 checks mappings 295 to see whether video player VP-1 is supported by the client application identified by HTTP request analyzer 260. If so, then video player selector 270 selects video player VP-1 at 506. If not, then at 508 video player selector checks mappings 295 to see whether video player VP-2 is supported by the client application identified by HTTP request analyzer 260. If so, then video player selector selects video player VP-2 at 510. If not, then the method continues in similar fashion for the next video player in the ordered list, until either a supported video player is found or the last video player in the ordered list is being considered. After the penultimate video player in the ordered list has been considered and found not to be supported by the client application identified by HTTP request analyzer 260, video player selector 270 selects the final video player VP-N at 512.

Figure 6:
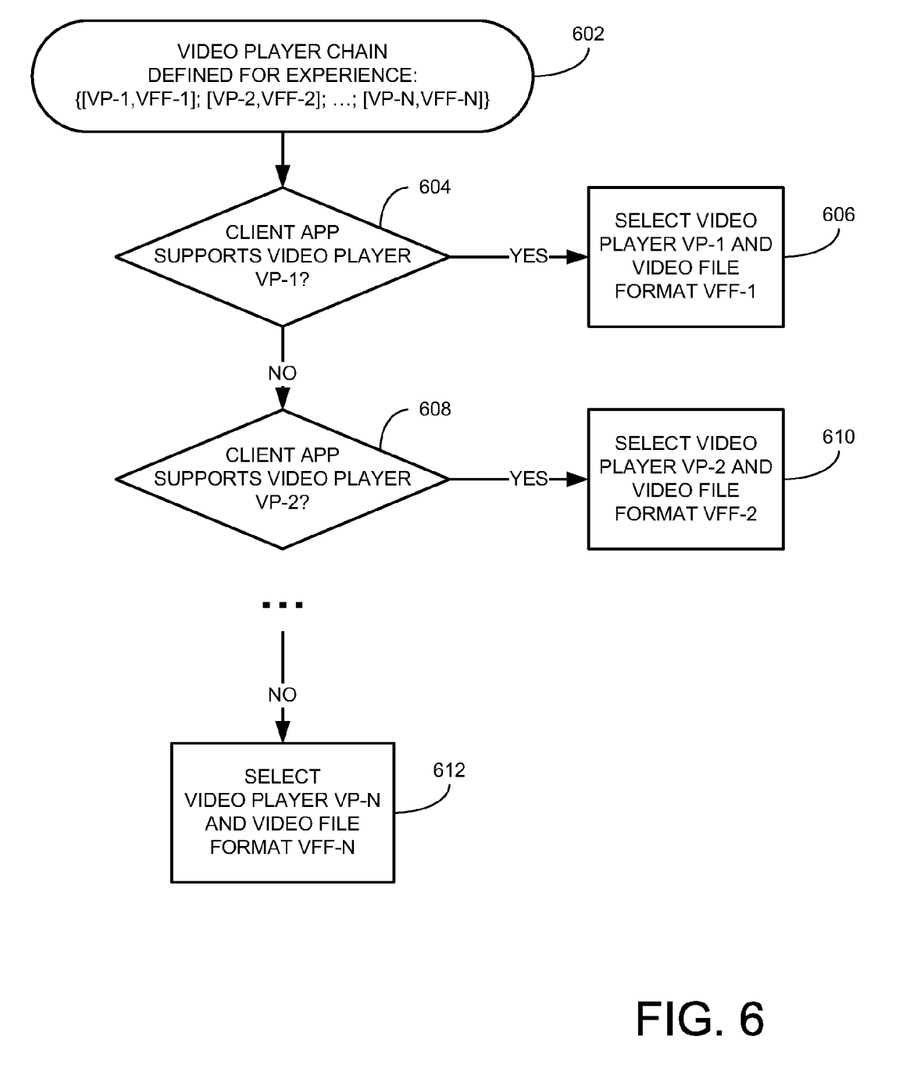
FIG. 6 is a flowchart of an example method for selecting a video player and its paired video file format.

FIG. 6 is a flowchart of an example method for selecting a video player and its paired video file format, to be implemented by video player selector 270. As mentioned above, selection of the video player depends on the experience and on the server-side detected identification of the client application that created the HTTP request.

An ordered list of one or more video players is associated with the experience to which the description of the requested webpage belongs. In the example illustrated in FIG. 6, the ordered list is {[VP-1,VFF-1], [VP-2,VFF-2], . . . , [VP-N, VFF-N]}, as indicated at 602, so that each video player in the ordered list has a paired video file format.

At 604, video player selector 270 checks mappings 295 to see whether video player VP-1 is supported by the client application identified by HTTP request analyzer 260. If so, then video player selector 270 selects [video player, video file format] pair [VP-1,VFF-1] at 606. If not, then at 608 video player selector checks mappings 295 to see whether video player VP-2 is supported by the client application identified by HTTP request analyzer 260. If so, then video player selector selects [video player, video file format] pair [VP-2,VFF-2] at 610. If not, then the method continues in similar fashion for the next video player in the ordered list, until either a supported video player is found or the last video player in the ordered list is being considered. After the penultimate video player in the ordered list has been considered and found not to be supported by the client application identified by HTTP request analyzer 260, video player selector 270 selects the final [video player, video file format] pair [VP-N,VFF-N] at 612.

Returning now to FIG. 1 and FIG. 2, consider the example configuration of client computers, client applications and video players provided above in Table 1.

Experience 230 Example—MP4+H.264+AAC Video Files; Experience Accessible by any Web Browser Consider the example where video files 1, 2 and 3 are MP4+H.264+AAC video files, and ordered list 236 of video players associated with experience 230 is: {HTML5 native video player for MP4+H.264+AAC; Windows Media® player; Silverlight® player}, all of which are capable of playing video files 1, 2 and 3.

Suppose an HTTP request is received from client application 118 (Internet Explorer® 9 beta web browser) or from client application 116 (iPhone® 3 web browser) and the HTTP request is for a portion or all of the webpage described by description 232 or for a portion or all of the webpage described by description 234. In this case, video player selector 270 will select the HTML5 native video player for MP4+H.264+AAC, because that video player is first in ordered list 236 and is supported by client application 118 and by client application 116. HTTP response generator 290 will generate an HTTP response to the HTTP request, the HTTP response to be returned to client application 118 or to client application 116.

If the HTTP request is for a portion or all of the webpage described by description 232, the HTML or XHTML text included in the HTTP response may reference video file 1 as follows:

```
<video src="video1.mp4"></video>
or
<video>
    <source src="video1.mp4" />
</video>
``` and may reference video file 2 as follows:

```
<video src="video2.mp4"></video>
or
<video>
    <source src="video2.mp4" />
</video>
``` where video1.mp4 is the filename of video file 1 and video2.mp4 is the filename of video file 2. Attributes of the <video> element and of the <source> element other than the attribute src may also be included in the HTML or XHTML text.

If the HTTP request is for a portion or all of the webpage described by description 234, the HTML or XHTML text included in the HTTP response may reference video file 3 as follows:

```
<video src="video3.mp4"></video>
or
<video>
    <source src="video3.mp4" />
</video>
``` where video 3.mp4 is the filename of video file 3. Attributes of the <video> element and of the <source> element other than the attribute src may also be included in the HTML or XHTML text.

Suppose an HTTP request is received from client application 112 (Internet Explorer® 6 web browser) and the HTTP request is for a portion or all of the webpage described by description 232 or for a portion or all of the webpage described by description 234. In this case, video player selector 270 will select the Windows Media® player, because the HTML5 native video player for MP4+H.264+AAC is not supported by client application 112, and because the Windows Media® player, which is next in ordered list 236, is supported by client application 112.

If the HTTP request is for a portion or all of the webpage described by description 232, the HTML or XHTML text included the HTTP response may reference video file 1 as follows:

```
<object type="application/x-ms-wmp">
    <param name="URL" value="video1.mp4" />
</object>
``` and may reference video file 2 as follows:

```
<object type="application/x-ms-wmp">
    <param name="URL" value="video2.mp4" />
</object>
```

Attributes of the <object> element other than the attribute type may also be included in the HTML or XHTML text. Attributes of the <param> element other than the attributes name and value may also be included in the HTML or XHTML text.

If the HTTP request is for a portion or all of the webpage described by description 234, the HTML or XHTML text included in the HTTP response may reference video file 3 as follows:

```
<object type="application/x-ms-wmp">
    <param name="URL" value="video3.mp4" />
</object>
```

Attributes of the <object> element other than the attribute type may also be included in the HTML or XHTML text. Attributes of the <param> element other than the attributes name and value may also be included in the HTML or XHTML text.

Suppose an HTTP request is received from client application 114 (Firefox® 3.6 web browser) and the HTTP request is for a portion or all of the webpage described by description 232 or for a portion or all of the webpage described by description 234. In this case, video player selector 270 will select the Silverlight® player, because the HTML5 native video player for MP4+H.264+AAC is not supported by client application 114, and because the Windows Media® player is not supported by client application 114, and because the Silverlight® player is the last player in ordered list 236.

If the HTTP request is for a portion or all of the webpage described by description 232, the HTML or XHTML text included the HTTP response may reference video file 1 as follows:

```
<object type="application/x-silverlight-2">
    <param name="source" value="MediaPlayer.xap" />
    <param name="InitParams" value="mediaurl=video1.mp4" />
</object>
``` and may reference video file 2 as follows:

```
<object type="application/x-silverlight-2">
    <param name="source" value="MediaPlayer.xap" />
    <param name="InitParams" value="mediaurl=video2.mp4" />
</object>
```

Attributes of the <object> element other than the attribute type may also be included in the HTML or XHTML text. Attributes of the <param> element other than the attributes name and value may also be included in the HTML or XHTML text.

If the HTTP request is for a portion or all of the webpage described by description 234, the HTML or XHTML text included in the HTTP response may reference video file 3 as follows:

```
<object type="application/x-silverlight-2">
    <param name="source" value="MediaPlayer.xap" />
    <param name="InitParams" value="mediaurl=video3.mp4" />
</object>
```

Attributes of the <object> element other than the attribute type may also be included in the HTML or XHTML text. Attributes of the <param> element other than the attributes name and value may also be included in the HTML or XHTML text.

Experience 240 Example—MP4+H.264+AAC Video Files; Experience Accessible Only by Client Application 119

Consider the example where video file is an MP4+H.264+AAC video file, and ordered list 246 of video players associated with experience 240 is: {HTML5 native video player for MP4+H.264+AAC}, which is capable of playing video file 4.

Experience 240 is accessible only by client application 119. If an HTTP request for a portion or all of the webpage described by description 242 is received from client application 119, then video player selector 270 will select the HTML5 native video player for MP4+H.264+AAC, because that is the only video player in ordered list 246. HTTP response generator 290 will generate an HTTP response to the HTTP request, the HTTP response to be returned to client computer 108 for handling by client application 119.

The HTML or XHTML text included in the HTTP response may reference video file 4 as follows:

```
<video src="video4.mp4"></video>
or
<video>
    <source src="video4.mp4" />
</video>
``` where video 4.mp4 is the filename of video file 4. Attributes of the <vide o> element and of the <source> element other than the attribute src may also be included in the HTML or XHTML text.

Experience 250 Example—MP4+H.264+AAC Video File and Ogg+Theora+Vorbis Video File for Same Video Content; Experience Accessible by any Web Browser Consider the example where video file 5 is an Ogg+Theora+Vorbis video file, video files 2 and 5 encode the same video content, and ordered list 256 of video players associated with experience 250 is: {[HTML5 native video player for MP4+H.264+ACC, MP4+H.264+AAC]; [HTML5 native video player for Ogg+Theora+Vorbis, Ogg+Theora+Vorbis]; [Windows Media® player, MP4+H.264+AAC]}.

Suppose an HTTP request is received from client application 118 (Internet Explorer® 9 beta web browser) or from client application 116 (iPhone® 3 web browser) and the HTTP request is for a portion or all of the webpage described by description 252. In this case, video player selector 270 will select the HTML5 native video player for MP4+H.264+AAC and the video file format MP4+H.264+AAC, because that video player is first in ordered list 256 and is supported by client application 118 and by client application 116. Web server 111 will retrieve video file 2, because it is in the video file format that is paired with the selected video player. HTTP response generator 290 will generate an HTTP response to the HTTP request, the HTTP response to be returned to client application 118 or to client application 116.

The HTML or XHTML text included in the HTTP response may reference video file 2 as follows:

```
<video src="video2.mp4"></video>
or
<video>
    <source src="video2.mp4" />
</video>
```

Attributes of the <video> element and of the <source> element other than the attribute src may also be included in the HTML or XHTML text.

Suppose an HTTP request for a portion or all of the webpage described by description 252 is received from client application 114 (Firefox® 3.6 web browser), then video player selector 270 will select the HTML5 native video player for Ogg+Theora+Vorbis and video file format Ogg+Theora+Vorbis, because the HTML5 native video player for MP4+H.264+AAC is not supported by client application 114, and because the HTML5 native video player for Ogg+Theora+Vorbis, which is next in ordered list 256, is supported by client application 114. Web server 111 will retrieve video file 5, because it is in the video file format that is paired with the selected video player. HTTP response generator 290 will generate an HTTP response to the HTTP request, the HTTP response to be returned to client computer 104 for handling by client application 114.

The HTML or XHTML text included in the HTTP response may reference video file 5 as follows:

```
<video src="video5.ogg"></video>
or
<video>
    <source src="video5.ogg" />
</video>
``` where video5.ogg is the filename of video file 5. Attributes of the <video> element and of the <source> element other than the attribute src may also be included in the HTML or XHTML text.

Suppose an HTTP request for a portion or all of the webpage described by description 252 is received from client application 112 (Internet Explorer® 6 web browser). In this case, video player selector 270 will select the Windows Media® player, because the HTML5 native video player for MP4+H.264+AAC is not supported by client application 112, and because the HTML5 native video player for Ogg+Theora+Vorbis is not supported by client application 112, and because the Windows Media® player is the last player in ordered list 256. Web server 111 will retrieve video file 2, because it is in the video file format that is paired with the selected video player. HTTP response generator 290 will generate an HTTP response to the HTTP request, the HTTP response to be returned to client computer 102 for handling by client application 112.

The HTML or XHTML text included the HTTP response may reference video file 2 as follows:

```
<object type="application/x-ms-wmp">
    <param name="URL" value="video2.mp4" />
</object>
```

Attributes of the <object> element other than the attribute type may also be included in the HTML or XHTML text. Attributes of the <param> element other than the attributes name and value may also be included in the HTML or XHTML text.

Figure 7:
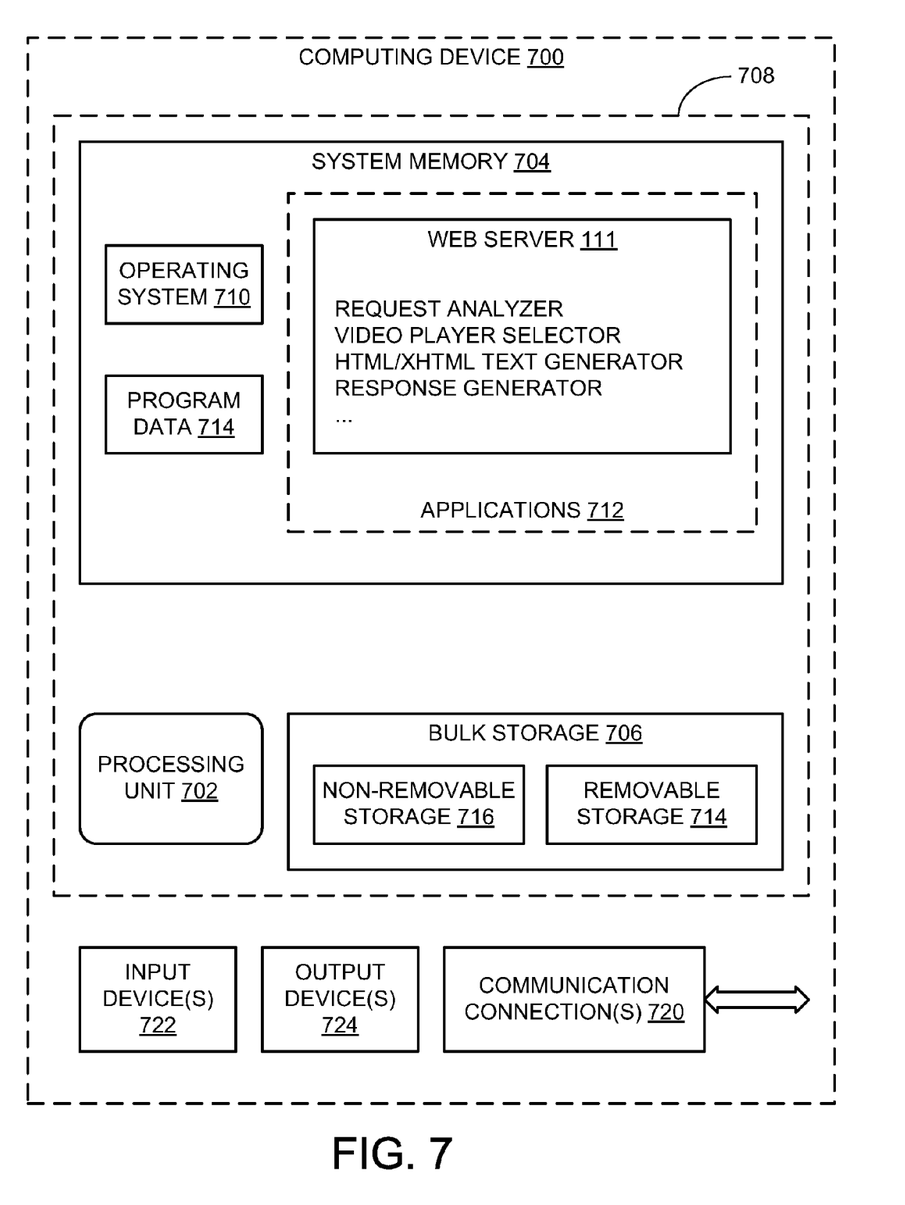
FIG. 7 is a simplified block diagram of an example computer system.

FIG. 7 is an illustration of an example computer system in which the described technology may be implemented. Server computer 101 is an example of a computer system. In its most basic configuration, a computer system 700 typically includes a processing unit 702, system memory 704, and bulk storage 706. This most basic configuration is illustrated in FIG. 7 by a dashed line 708. Depending on the exact configuration and type of computing device, system memory 704 may be volatile (such as random access memory 'RAM'), non-volatile (such as read-only memory 'ROM', flash memory, etc.) or some combination of the two. System memory 704 typically includes an operating system 710, one or more applications 712, and may include program data 714. In the case of server computer 101, applications 712 includes web server 111.

Bulk storage 706 may provide additional storage (removable and/or non-removable), including, but not limited to non-volatile memory such as magnetic or optical disks or tape. Such additional storage is illustrated in FIG. 7 by removable storage 714 and non-removable storage 716. Descriptions of webpages and video files may be stored anywhere in bulk storage 706.

Computer storage media includes volatile and nonvolatile, removable and non-removable media implemented in any method or technology for storage of information such as computer readable instructions, data structures, program modules or other data. Memory 704, removable storage 714 and non-removable storage 716 are all examples of computer storage media. Computer storage media includes, but is not limited to, RAM, ROM, electrically erasable programmable ROM 'EEPROM', flash memory or other memory technology, compact disk ROM 'CD-ROM', DVD or other optical storage, magnetic cassettes, magnetic tape, magnetic disk storage or other magnetic storage devices, or any other medium which can be used to store the desired information and which can be accessed by computer system 700. Any such computer storage media may be part of computer system 700.

Additionally, computer system 700 includes communication connection(s) 720 that allow the computer system to communicate with other computer systems, networks and peripheral devices. For example, server computer 101 uses communication connection(s) 720 to communicate with client computer 102 via network 103, with client computers 104 and 106 via network 105, and with client computer 108 via network 107. Communication connection(s) 720 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media. The term computer-readable media as used herein includes both physical computer storage media and communication media.

Computer system 700 may also have input device(s) 722 such as keyboard, mouse, pen, voice input device, touch input device, etc. Computer system 700 may also have output device(s) 724 such as a display, speakers, printer, etc. All these devices are well known in the art and need not be discussed at length here.

While FIG. 7 illustrates an example of a computer system that may implement the principles of the described technology, any computer system may implement the features of the described technology. In the description and in the claims, a "computer system" is defined broadly as any hardware component or components that are capable of using software to perform one or more functions. Examples of computer systems include desktop computers, laptop computers, notebook computers, tablet computers, pocket computers, Personal Digital Assistants 'PDAs', smartphones, telephones (both wired and mobile), wireless access points, gateways, firewalls, proxies, routers, switches, hand-held devices, multiprocessor systems, microprocessor-based or programmable consumer electronics, network PCs, minicomputers, mainframe computers, embedded computing devices (e.g. computing devices built into a car or ATM 'automated teller machine') or any other system or device that has processing capability.

Those skilled in the art will also appreciate that the described technology may be practiced in network computing environments using virtually any computer system configuration. The described technology may also be practiced in distributed system environments where local and remote computer systems, which are linked (either by hardwired links, wireless links, or by a combination of hardwired and wireless links) through a network, both perform tasks. In a distributed system environment, program modules may be located in both local and remote memory storage devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of handling webpage requests, comprising:
receiving a first request for a requested webpage or portion thereof that is to have video content embedded therein, the first request created by a first client application and including a first indication of a client application type of the first client application;
determining the client application type of the first client application based on the first indication included in the first request;
providing to the first client application a first response to the first request, the first response including a first reference to the video content that refers to the video content in a manner specific to a first type of video player, and the first response determined based at least in part on the determined client application type of the first client application;
receiving a second request for the requested webpage or the portion thereof, the second request created by a second client application that is different from the first client application, and the second request including a second indication of the client application type of the second client application;
determining the client application type of the second client application based on the second indication included in the second request; and
providing to the second client application a second response to the second request, the second response including a second reference to the video content that refers to the video content in a manner specific to a second type of video player that is different from the first type of video player, and the second response determined based at least in part on the determined client application type of the second client application.

2. The method as claimed in claim 1, further comprising:
providing to the first client application a first video file that encodes the video content in a first video file format, where the first reference refers to the first video file; and
providing the first video file to the second client application, where the second reference refers to the first video file.

3. The method as claimed in claim 1, further comprising:
providing to the first client application a first video file that encodes the video content in a first video file format, where the first reference refers to the first video file; and
providing to the second client application a second video file that encodes the video content in a second video file format that is different from the first video file format, where the second reference refers to the second video file.

4. The method as claimed in claim 1, wherein the first video player is supported by the first client application.

5. The method as claimed in claim 4, wherein the second video player is supported by the first client application.

6. The method as claimed in claim 4, wherein the second video player is not supported by the first client application.

7. The method as claimed in claim 1, wherein the first video player is not supported by the first client application.

8. The method as claimed in claim 1, further comprising:
determining that the first client application created the first request by analyzing the first request.

9. The method as claimed in claim 1, further comprising:
analyzing a description of the requested webpage;
determining, in response to analyzing the description of the requested webpage that the video content is to be embedded in the requested webpage;
determining support of the first client application for each of multiple video players of an ordered list, each of the video players of the ordered list being associated with the requested webpage;
selecting a last video player of the ordered list as the first video player in response to a determination that the first client application does not support any video player of the ordered list; and
selecting a first video player in the ordered list that is supported by the first client application in response to a determination that the first client application supports one or more video players of the ordered list.

10. The method as claimed in claim 9, wherein the description is a static webpage and the first reference refers to the video content in a different manner than the manner in which the static webpage refers to the video content.

11. The method as claimed in claim 9, wherein the description is a description of a dynamic webpage.

12. The method as claimed in claim 1, further comprising:
generating the first reference.

13. The method as claimed in claim 1, further comprising:
obtaining a cache key for a combination of the requested webpage and the first video player;
in response to the cache key not corresponding to any entry in a cache of references:
generating the first reference;
caching the first reference in the cache; and
associating the first reference to the cache key; and
in response to the cache key corresponding to an entry in the cache,
loading the first reference from the cache.

14. A computer-readable device having computer-executable components stored therein, the computer-executable components comprising:
a request analyzer to analyze a Hypertext Transfer Protocol 'HTTP' request for a requested webpage in which video content is to be embedded and to determine from the HTTP request which client application created the HTTP request;
a video player selector to receive an identification of the client application that created the HTTP request from the request analyzer and to select a selected video player by:
determining whether the client application that created the HTTP request supports any video player in an ordered list of one or more video players associated with the requested webpage;
selecting as the selected video player a last video player in the ordered list in response to a determination that the client application does not support any video player of the ordered list; and
selecting as the selected video player a first video player in the ordered list that is supported by the client application in response to a determination that the client application supports one or more video players of the ordered list;
a Hypertext Markup Language/eXtensible Hypertext Markup Language 'HTML/XHTML' generator to receive an indication of the selected video player from the video player selector and to obtain HTML or XHTML text that references the video content solely in a manner specific to the selected video player; and
an HTTP response generator to receive the HTML or XHTML text from the HTML/XHTML generator and to generate an HTTP response to the HTTP request, the HTTP response including the HTML or XHTML text.

15. The computer-readable memory as claimed in claim 14, wherein the HTML/XHTML generator is to generate the HTML or XHTML text that references the video content solely in the manner specific to the selected video player.

16. The computer-readable memory as claimed in claim 14, wherein the HTML/XHTML generator is (i) to obtain a cache key for a combination of the requested webpage and the selected video player, (ii) where the cache key does not correspond to any entry in a cache, to generate the HTML or XHTML text that references the video content solely in the manner specific to the selected video player and to cache the HTML or XHTML text in the cache indexed by the cache key, and (iii) where the cache key corresponds to an entry in the cache, to load the HTML or XHTML text from the cache.

17. A computer system comprising:
a communication connection through which the computer system is able to communicate with client computers;
a processing unit; and
a system memory storing a web server, the web server operable to:
receive a first request for a requested webpage or portion thereof that is to have video content embedded therein, the first request created by a first client application and including a first indication of a client application type of the first client application;
determine the client application type of the first client application based on the first indication included in the first request;
provide to the first client application a first response to the first request, the first response including first reference that refers to the video content in a manner determined to be appropriate for a first video player, and the first response determined based at least in part on
the determined client application type of the first client application;
receive a second request for the requested webpage or the portion thereof, the second request created by a second client application that is different from the first client application, and the second request including a second indication of the client application type of the second client application;
determine the client application type of the second client application based on the second indication included in the second request; and
provide to the second client application a second response to the second request, the second response including second reference that refers to the video content in a manner determined to be appropriate for a second video player that is different from the first video player, and the second response determined based at least in part on the determined client application type of the second client application.

18. The computer system as claimed in claim 17, wherein the web server is further operable to:
provide to the first client application a first video file that encodes the video content in a first video file format; and to provide the first video file to the second client application, where the first reference and the second reference both refer to the first video file.

19. The computer system as claimed in claim 17, wherein the web server is further operable to:
provide to the first client application a first video file that encodes the video content in a first video file format; and to provide to the second client application a second video file that encodes the video content in a second video file format that is different from the first video file format, and wherein the first reference refers to the first video file and the second reference refers to the second video file.

20. The computer system as claimed in claim 17, wherein the web server is further operable to:
determine that the first client application created the first request by analyzing the first request.

* * * * *